US012641093B2

(12) United States Patent
Seiler et al.

(10) Patent No.: US 12,641,093 B2
(45) Date of Patent: May 26, 2026

(54) PROTECTION OF COMPUTING DEVICE FROM POTENTIAL OPTICAL NETWORK INTRUSION ATTACK

(71) Applicant: Hewlett-Packard Development Company, L.P., Spring, TX (US)

(72) Inventors: Peter Seiler, Fort Collins, CO (US); Nicolas James Jurich, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 84 days.

(21) Appl. No.: 18/551,337

(22) PCT Filed: Apr. 30, 2021

(86) PCT No.: PCT/US2021/030130
§ 371 (c)(1),
(2) Date: Sep. 19, 2023

(87) PCT Pub. No.: WO2022/231618
PCT Pub. Date: Nov. 3, 2022

(65) Prior Publication Data
US 2024/0179162 A1 May 30, 2024

(51) Int. Cl.
*H04L 9/40* (2022.01)
*H04B 10/85* (2013.01)

(52) U.S. Cl.
CPC ......... *H04L 63/1416* (2013.01); *H04B 10/85* (2013.01)

(58) Field of Classification Search
CPC . H04L 63/1416; H04L 63/14; H04L 63/1408; H04L 63/1425; H04B 10/85; H04B 10/80
USPC .......................................................... 726/23
See application file for complete search history.

(56) References Cited

U.S. PATENT DOCUMENTS

| | | | | |
|---|---|---|---|---|
| 6,182,223 B1 * | 1/2001 | Rawson | .................... | G06F 1/24 |
| | | | | 713/165 |
| 6,725,377 B1 * | 4/2004 | Kouznetsov | ............ | G06F 21/55 |
| | | | | 709/224 |
| 10,211,977 B1 * | 2/2019 | Roth | ...................... | H04L 9/3234 |
| 2002/0075906 A1 * | 6/2002 | Cole | ............... | H04B 10/25756 |
| | | | | 370/535 |
| 2004/0205360 A1 * | 10/2004 | Norton | ................ | H04L 63/0227 |
| | | | | 726/23 |
| 2006/0215545 A1 * | 9/2006 | Nelson | ............... | H04B 10/0799 |
| | | | | 370/216 |

(Continued)

FOREIGN PATENT DOCUMENTS

WO        2011/012092 A1      2/2011

*Primary Examiner* — Kaylee J Huang
(74) *Attorney, Agent, or Firm* — Quarles & Brady LLP

(57) ABSTRACT

A computing device includes an optical network transceiver and a basic input/output system (BIOS). The optical network transceiver is to connect to an optical network and to generate an event indicating that an optical signal strength has attenuated below a threshold. The BIOS is to determine generation of the event by the optical network transceiver, and responsively detect occurrence of a potential optical network intrusion attack. In response to detecting occurrence of the potential optical network intrusion attack, the BIOS is to perform an action to protect the computing device from the potential optical network intrusion attack.

19 Claims, 4 Drawing Sheets

(56)  References Cited

U.S. PATENT DOCUMENTS

| | | | | |
|---|---|---|---|---|
| 2007/0234426 A1* | 10/2007 | Khanolkar | .......... | H04L 63/1408 726/23 |
| 2010/0031349 A1* | 2/2010 | Bingham | ................ | G06F 21/31 726/20 |
| 2010/0125900 A1 | 5/2010 | Dennerline et al. | | |
| 2011/0179316 A1* | 7/2011 | Geuzebroek | ............ | H04L 43/00 714/48 |
| 2012/0278889 A1* | 11/2012 | El-Moussa | .......... | H04L 63/1475 726/23 |
| 2013/0305371 A1 | 11/2013 | Figlin et al. | | |
| 2015/0057881 A1* | 2/2015 | Raab | .................... | H04W 48/18 701/36 |
| 2016/0099772 A1* | 4/2016 | Mesh | .................... | H04B 10/85 398/38 |
| 2016/0182338 A1* | 6/2016 | Ragupathi | ............... | H04L 67/02 709/224 |
| 2017/0055179 A1* | 2/2017 | Radunovic | ............ | H04L 5/0096 |
| 2017/0085581 A1* | 3/2017 | Jackson | ............. | H04L 63/1416 |
| 2018/0375891 A1* | 12/2018 | Juncker | ................ | H04L 63/104 |
| 2019/0305844 A1* | 10/2019 | Weng | ................ | H04Q 11/0005 |

* cited by examiner

FIG 1

PROTECTION OF COMPUTING DEVICE FROM POTENTIAL OPTICAL NETWORK INTRUSION ATTACK

BACKGROUND

Computing devices have traditionally been networked in a non-wireless manner using copper or other electrically conductive cables. More recently, computing devices have been networked in a non-wireless manner using fiber optic cables in the case of an optical network. Optical networks generally have greater throughput than networks that employ copper cables, permitting faster communication among networked computing devices.

BRIEF DESCRIPTION OF THE DRAWINGS

FIG. 1 is a diagram of an example system including a computing device connected to an optical network via an optical network transceiver.

DETAILED DESCRIPTION

Figure 2:
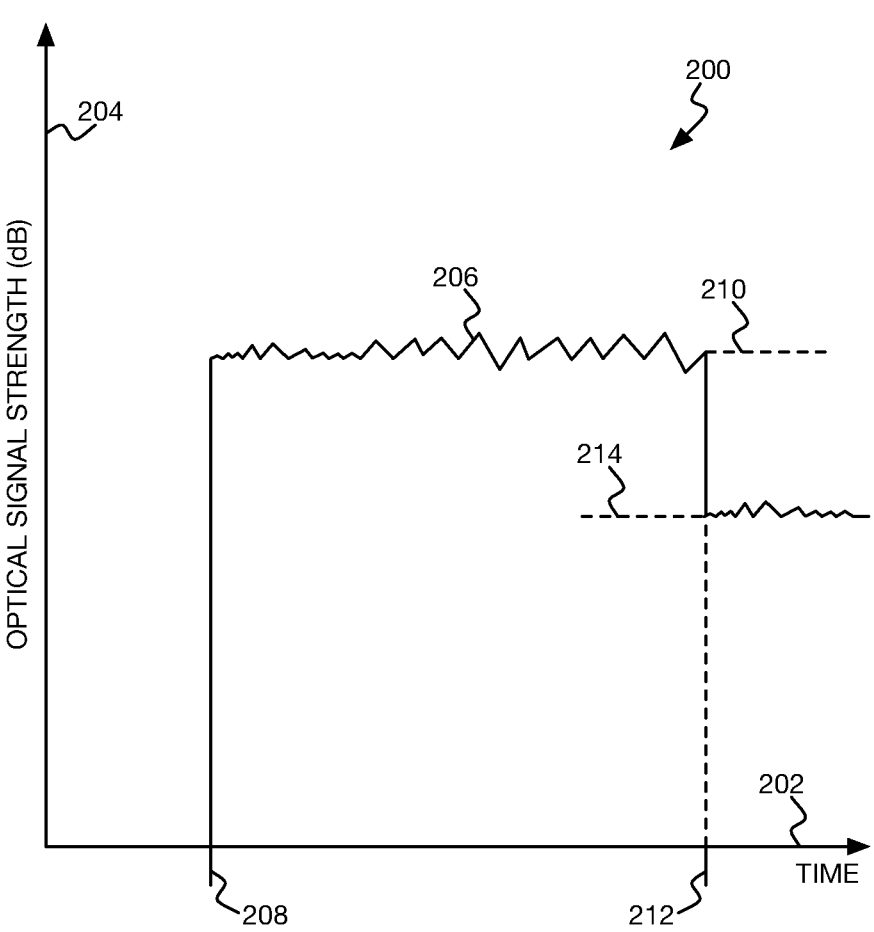
FIG. 2 is a diagram of an example graph depicting attenuated optical signal strength that can result when a fiber optic cable interconnecting a computing device to an optical network is tapped.

As noted in the background, computing devices, such as desktop, laptop, notebook, and other types of computers, including server computers, as well as other types of computing devices, can be interconnected with one another over an optical network. In an optical network, each computing device has an optical network transceiver that is connected to a corresponding optical network transceiver of an optical network switch or other network device via a fiber optic cable, which can also be referred to as an optical fiber cable. For example, a switch may have multiple network ports that are each associated with a different optical network transceiver. For each computing device connected to the switch, a fiber optic cable is connected from a network port of an optical network transceiver of that computing device to a corresponding network port of an optical network transceiver of the switch.

Optical networks are susceptible to intrusion attacks via taps being placed on the fiber optic cables directly connecting the computing devices to switches or other optical network devices. By tapping an optical fiber cable, a malicious party can divide the optical signal traveling between a computing device and an optical network device into two optical signals that are each identical to the original signal. One optical signal remains directed to the original computing device, whereas the other optical signal may be diverted to the malicious party's own computing device. The malicious party can thus monitor communication to and from the original computing device, without affecting the communication and therefore potentially escaping detection.

Techniques described herein protect a computing device from such potential optical network intrusion attacks. A computing device includes an optical network transceiver connected to an optical network via an optical fiber cable.

The optical network transceiver is of a type that can generate an event indicating that the signal strength of the optical signal carried on the optical fiber cable has attenuated below a threshold. In response to determining that the transceiver has generated such an event, the computing device correspondingly detects occurrence of a potential optical network intrusion attack, and can responsively perform an action to protect the device from the attack.

The techniques therefore leverage the fact that when an optical tap has been placed on the optical fiber cable interconnecting a computing device and an optical network device such as an optical network switch, the strength of the optical signal at the optical network transceiver of the computing device will become attenuated. Such attenuation is treated as the occurrence of a potential optical network intrusion attack (even if the attenuation occurs for a different reason), and a protective action is responsively performed. Detection of the potential intrusion attack and performance of the resulting protective action thus occur at the computing device, as opposed to, for instance, the optical network switch.

Detection of the occurrence of a potential network intrusion attack due to signal strength attenuation does not have an analog in non-optical networks, such as wired networks that employ copper or other electrically conductive cables. In such networks, for instance, potential network intrusion attacks may be detected at a much higher level, such as by analyzing network traffic at the packet, protocol, or transport level. Whereas potential network intrusion attack detection in this manner can also be performed in optical networks, the techniques described herein instead detect potential attacks at a much lower level by considering optical signal strength attenuation that results when optical fiber cables are nefariously tapped.

Figure 1:
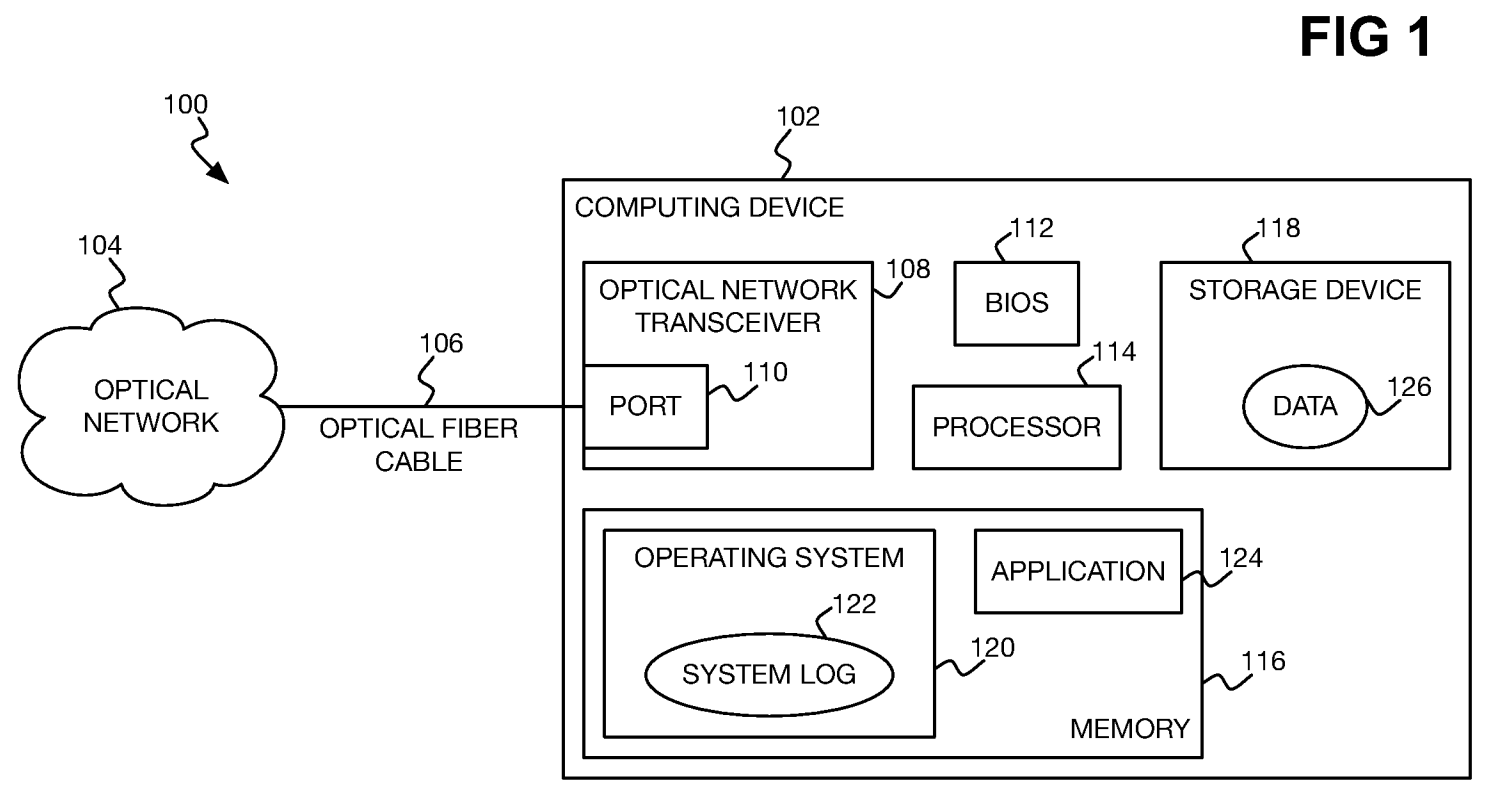

FIG. 1 shows an example system 100 including a computing device 102 connected to an optical network 104 via an optical fiber cable 106, such as a fiber optic cable. The computing device 102 may be a desktop, laptop, or notebook computer, another type of computer such as a server computer, or another type of computing device altogether. The optical network 104 may include an optical network switch or another optical network device to which the optical fiber cable 106 at the other end of the computing device 102 is directly connected, for instance. Whereas one computing device 102 is depicted, in actuality there can be multiple computing devices 102 that are each connected to the optical network 104 via a corresponding optical fiber cable 106.

The computing device 102 includes an optical network transceiver 108 having a network port 110 to which the optical fiber cable 106 is connected. Whereas one optical network transceiver 108 having the network port 110 is depicted, the computing device 102 may have more than one optical network transceiver 108 that each have an associated network port 110. The optical network transceiver 108 modulates data to be transmitted to the optical network 104 on an optical signal (e.g., beams of light) within the optical fiber cable 106, and similarly demodulates data received from the optical network 104 on the optical signal. As such, the optical network transceiver 108 permits the computing device 102 to communicate data over the network 104.

The computing device 102 also includes a basic input/output system (BIOS) 112, a processor 114, a memory 116 from which the processor 114 executes an operating system 120 and an application 124, and a storage device 118. For example, the operating system 120 and the application 124 may be stored on the storage device 118, which may be non-volatile storage such as a hard disk drive or a solid state drive, and may be partially or completely loaded from the storage device 118 into the memory 116 for execution by the processor 114. The memory 116 may be volatile memory, such as volatile semiconductor memory like dynamic random access memory (DRAM). The computing device 102 may include other hardware and software components, besides those depicted in the figure.

The BIOS 112 refers to hardware or hardware and instructions to initialize, control, or operate the computing device 102, including prior to execution of an operating system 120 of the computing device 102. Instructions included within the BIOS 112 may be software, firmware, microcode, or other programming that defines or controls functionality or operation of the BIOS 112. As one example, the BIOS 112 may be implemented using instructions, such as platform firmware of the computing device 102, executable by a processor 114. The BIOS 112 may initialize, control, or operate components such as hardware components of the computing device 102, and may load or boot the operating system 120 of the computing device 102.

In some examples, the BIOS 112 may provide or establish an interface between the hardware devices or platform firmware of the computing device 102 and the operating system 120 of the computing device 102. The operating system 120 may control or operate the hardware devices or platform firmware via this interface. In some examples, the BIOS 112 may implement the Unified Extensible Firmware Interface (UEFI) specification or another specification or standard for initializing, controlling, or operating the computing device 102.

The operating system 120 is system software that manages computer hardware and software resources, and provides common drivers and services for computer programs such as the application 124. The application 124 runs in the context of the operating system 120. Whereas one such application 124 is depicted, in actuality there can be multiple applications 124 that can each be loaded from the storage device 118 into the memory 116 for execution. The operating system 120 may maintain a system log 122 of the system events and messages that occur during execution of the operating system 120.

The storage device 118 can store data 126. The data 126 may be the information in relation to which the application 124 (and other applications) perform functionality. For example, the data 126 may include user-created and user-retrieved data, such as word processing documents, spreadsheet files, and so on. As the data 126 is actively worked on, it may be moved to the memory 116, and then moved back to the storage device 118 for archival purposes. In the context of an enterprise or other environment, the data 126 may include sensitive and confidential business and other information.

FIG. 2 shows an example graph 200 depicting optical signal strength attenuation when the optical fiber cable 106 between the optical network transceiver 108 of the computing device 102 and the optical network 104 is tapped. The x-axis 202 denotes time, and the y-axis 204 denotes optical signal strength, such as in decibels (dB). The line 206 denotes the strength of the optical signal carried on the optical fiber cable 106.

At time 208, an optical network connection is established between the optical network transceiver 108 of the computing device 102 and the optical network 104. That is, at time 208 the optical fiber cable 106 has been plugged into the network port 110 of the optical network transceiver 108, and the network port 110 is enabled and operational. Likewise, at time 208 the other end of the optical fiber cable 106 has been plugged into a corresponding network port of an optical network transceiver of an optical network switch or other optical network device that is enabled and operational.

Therefore, the strength of the optical signal carried on the optical fiber cable 106 as indicated by the line 206 rises to an average or median optical signal strength 210. The optical signal strength may vary over time somewhat once the optical network connection has been established, but it will not vary greatly, and instead stays at about the optical signal strength 210 depicted in the figure. That is, while the optical network connection between the computing device 102 and the optical network 104 is active, the optical signal strength remains more or less constant.

However, at time 212 the optical fiber cable 106 is tapped, such as pursuant to an optical network intrusion attack. Because a portion of the optical signal carried on the optical fiber cable 106 is diverted to the tap, the optical signal strength at the optical network transceiver 108 of the computing device 102, as indicated by the line 206, is attenuated to a lower optical signal strength 214. The optical signal strength 214 may still be sufficient for the optical network connection between the computing device 102 and the optical network 104 to remain active. Therefore, from the perspective of computing device 102, usage of the device 102 can continue as before, with no loss in functionality of the computing device 102.

The optical network transceiver 108 of the computing device 102 is of a type that can generate an event when the strength of the optical signal carried on the optical fiber cable 106 connected to the network port 110 has attenuated below a threshold. An example of such an optical network transceiver 108 is the transceiver available from Allied Telesis Holdings, K. K., of Tokyo, Japan, under model number AT-29M2/LC-AF-901. In the example of FIG. 2, the threshold may be above the optical signal strength 214 corresponding to tapping of the optical fiber cable 106, but below the normal range of variation about the optical signal strength 210. The threshold may further be higher than another threshold that is indicative of insufficient optical signal strength at which to maintain or establish an optical network connection between the computing device 102 and the optical network 104.

The event generated by the optical network transceiver 108 is not necessarily indicative of an optical network intrusion attack has occurred resulting from tapping of the optical fiber cable 106. Rather, the event just indicates that the strength of the optical signal carried on the optical fiber cable 106 is below a threshold lower than the expected optical signal strength 210 when an optical network connection has been established. This threshold may be set in the field (i.e., once the computing device 102 including the optical network transceiver 108 has been deployed) or at the factory (i.e., during manufacture of the device 102 and/or the transceiver 108) to a level greater than the expected optical signal strength 214 when the optical fiber cable 106 is tapped.

Figure 3:
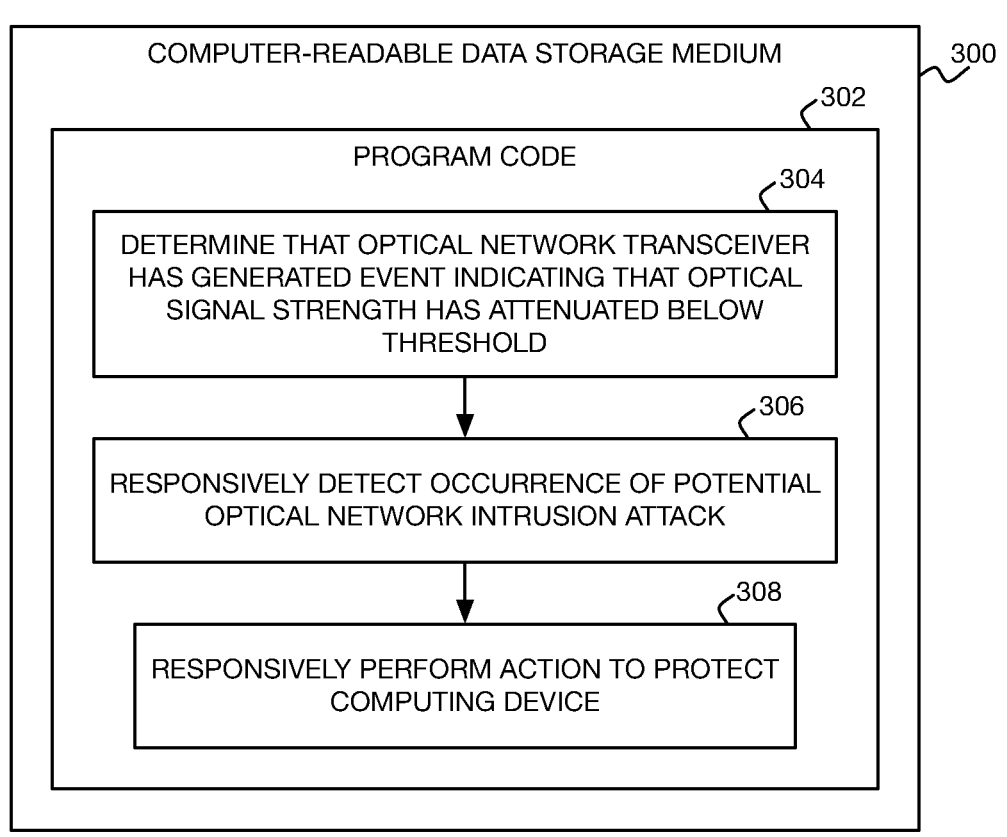
FIG. 3 is a diagram of an example non-transitory computer-readable data storage medium storing program code executable by a computing device to protect the computing device from a potential optical network intrusion attack.

FIG. 3 shows an example non-transitory computer-readable data storage medium 300 storing program code 302 executable by the computing device 102 to protect the device 102 from a potential optical network instruction attack. The BIOS 112 of the computing device 102 determines that the optical network transceiver 108 has generated an event indicating that optical signal strength has attenuated below a threshold (304). For example, the BIOS 112 may periodically poll the optical network transceiver 108 to determine whether the transceiver 108 has generated the event. As another example, the optical network transceiver 108 may issue an interrupt when the transceiver 108 has generated the event, which the BIOS 112 receives.

In response to determining that the event has been generated by the optical network transceiver 108, the BIOS 112 of the computing device 102 detects the occurrence of a potential optical network intrusion attack (306). That is, on the basis of the generated event indicating that optical signal strength has attenuated below the threshold, the BIOS 112 concludes that a potential optical network intrusion attack has occurred. The optical network intrusion attack is a potential such attack, in that the optical signal strength may have attenuated below the threshold for a reason other than an attack pursuant to which a tap has been placed on the optical fiber cable 106. However, the BIOS 112 nevertheless assumes that an optical network intrusion attack has occurred in how it responds.

Specifically, in response to detecting the occurrence of the potential optical network intrusion attack, the BIOS 112 of the computing device 102 performs an action to protect the device 102 from the attack should it have actually occurred (308). The BIOS 112 can perform any of a number of different such actions in this respect. For example, the BIOS 112 may disable the network port 110 of the optical network transceiver 108 to which the optical fiber cable 106 is connected. Therefore, the computing device 102 is disconnected from the optical network 104, preventing the malicious party behind the optical network intrusion attack from compromising the device 102.

As another example, the BIOS 112 may transmit a network packet over the optical network 104 to a specified destination indicating that the potential optical network intrusion attack has occurred. The network packet may provide information regarding the potential attack insofar as known. For instance, such information may include the time at which the optical signal strength attenuated below the threshold.

As a third example, the BIOS 112 may disable the computing device 102 to prevent further usage of the device 102 until the potential optical network intrusion attack has been resolved. Therefore, the malicious party behind the optical network intrusion attack is unable to use and thus compromise the computing device 102. For instance, the BIOS 112 may cause the operating system 120 to immediately shutdown, and prevent the operating system 120 from being restarted until the BIOS 112 receives physical user input at the computing device 102 (i.e., via a keyboard or other input device directly connected to the device 102) that it is ok to do so.

As a fourth, more extreme, example, the BIOS 112 may immediately erase all the data 126 stored on the storage device 118. Therefore, the likelihood that the malicious party will have been able to compromise the confidentiality of the information contained in the data 126 will be limited. This type of action may be performed in scenarios in which the data 126 is of a highly sensitive nature, for instance.

As another example, the BIOS 112 may transmit a notification event to the operating system 120 being executed by the processor 114 to indicate that the potential optical network intrusion attack has occurred. In response, the operating system 120 may notify a user of the occurrence of the potential optical network intrusion attack. The operating system 120 may display an alert to the user on the display of the computing device 102, for instance, or otherwise notify the user. The operating system 120 may also create an audible alert to correspond to the visual queue of a potential optical network intrusion attack. The operating system 120 may, after notifying the user, request acknowledgment from the user, such as by selecting a button or other graphical user interface (GUI) control.

The operating system 120 may, after notifying the user, in addition or instead present the user with a list of resolution actions that can be performed to protect the computing device 102 from the attack, and receive user selection of one of the resolution actions from the list. The resolution actions can include those that have been described (e.g., prevent further usage of the computing device 102, erase the data 126 stored on the storage device 118, and so on). The operating system 120 may then cause the selected resolution action to be performed.

The operating system 120 may, in response to receiving the notification event from the BIOS 112, also or instead log the event within the system log 122. The operating system 120 may in addition or instead transmit the notification event to the application 124 for resolution. For instance, the application 124 may be a security-oriented application. The application 124 can then itself perform an action to resolve the potential optical network intrusion attack, such as one of the actions that have been described. The default action taken by the operating system 120 may also be preconfigured for the application 124 according to an enterprise policy stored in the data 126 on the storage device 118.

Figure 4:
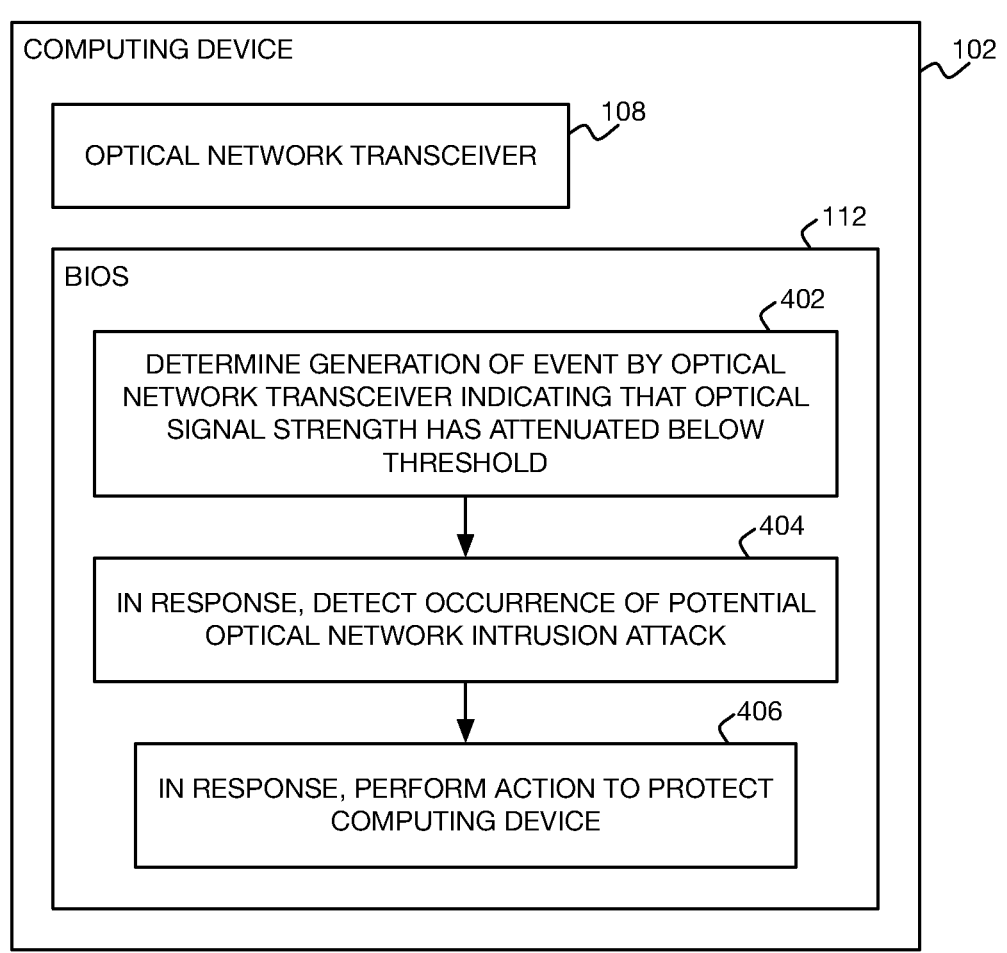
FIG. 4 is a block diagram of an example computing device having an optical network transceiver to connect to an optical network.

FIG. 4 shows a block diagram of the example computing device 102. The computing device 102 includes the optical network transceiver 108 to connect to the optical network 104 and to generate an event indicating that optical signal strength has attenuated below a threshold. The computing device includes the BIOS 112. The BIOS 112 is to determine generation of the event by the optical network transceiver 108 (402), and in response detect occurrence of a potential optical network intrusion attack (404). In response to detecting occurrence of the potential optical network intrusion attack, the BIOS 112 is to perform an action to protect the computing device from the potential optical network intrusion attack (406).

Techniques have been described for protecting a computing device 102 from a potential optical network intrusion attack. The computing device 102 leverages the ability of an optical network transceiver 108 of the device to generate an event when optical signal strength has attenuated below a threshold. Corresponding detection of a potential optical network intrusion attack is thus detecting at the computing device 102 itself, as opposed to at an optical network switch or other optical network device to which the optical network transceiver 108 is connected via an optical fiber cable 106. Therefore, an action to protect the computing device 102 can be initiated by and at the device 102 itself.

We claim:
1. A computing device comprising:
an optical network transceiver to connect to an optical network and to generate an event indicating that an optical signal strength has attenuated below a threshold; and
a basic input/output system (BIOS) including instructions that, when executed, cause a processor to:
determine generation of the event by the optical network transceiver responsive to receipt of an interrupt from the optical network transceiver indicating that the event has occurred at the computing device;
in response to determining that the event has been generated by the optical network transceiver, detect occurrence of a potential optical network intrusion attack; and in response to detecting the occurrence of the potential optical network intrusion attack, perform an action at the computing device to protect the computing device from the potential optical network intrusion attack.

2. The computing device of claim 1, wherein the action comprises:

disabling a network port at which the optical network transceiver is connected to the optical network.

3. The computing device of claim 1, further comprising:

the processor to execute an operating system, wherein the action comprises:

transmitting a notification event from the BIOS to the operating system indicating that the potential optical network intrusion attack has occurred.

4. The computing device of claim 3, wherein the operating system is to:

in response to receiving the notification event from the processor, notify a user of the occurrence of the potential optical network intrusion attack.

5. The computing device of claim 4, wherein the operating system is to further:

after notifying the user, request acknowledgment from the user of the occurrence of the potential optical network intrusion attack.

6. The computing device of claim 4, wherein the operating system is to further:

after notifying the user, present the user with a list of resolution actions regarding the potential optical network intrusion attack;

receive user selection of a resolution action from the list of resolution actions; and cause performance of the resolution action that has been selected.

7. The computing device of claim 3, wherein the operating system is to further:

in response to receiving the notification event from the processor, logging the notification event within a system log.

8. The computing device of claim 3, wherein the processor is further to execute an application via the operating system, and the operating system is to further:

in response to receiving the notification event from the processor, transmitting the notification event to the application for resolution.

9. The computing device of claim 1, wherein the action comprises:

transmitting a network packet to a specified destination indicating that the potential optical network intrusion attack has occurred, wherein the network packet includes information related to the potential optical network intrusion attack.

10. The computing device of claim 1, wherein the action comprises:

disabling the computing device to prevent further usage of the computing device until the potential optical network intrusion attack has been resolved.

11. The computing device of claim 1, further comprising:

a storage device storing data, wherein the action comprises:

erasing the data stored on the storage device.

12. The computing device of claim 1, wherein the processor is to determine the generation of the event by the optical network transceiver by periodically polling the optical network transceiver to determine whether the event has occurred.

13. The computing device of claim 1, wherein the processor is to receive the interrupt from the optical network transceiver that the event has occurred.

14. The computing device of claim 1, wherein the optical network transceiver is connected to the optical network using an optical fiber cable, wherein the optical signal strength corresponds to an optical signal that travels between the optical network and the computing device via the optical fiber cable; and wherein the optical network transceiver is to detect when the optical signal strength of the optical signal attenuates below a threshold.

15. The computing device of claim 1, wherein the potential optical network intrusion attack occurs responsive to an unauthorized tap being placed directly on an optical fiber cable.

16. A non-transitory computer-readable data storage medium storing program code executable by a computing device to:

responsive to receipt of an interrupt from an optical network transceiver of the computing device indicating that an event has occurred at the computing device, determine, with a basic input/output system (BIOS) of the computing device, that the optical network transceiver has generated the event indicating that an optical signal strength at the computing device has attenuated below a threshold, wherein the optical network transceiver is connected to an optical network;

responsively detect, by the BIOS, occurrence of a potential optical network intrusion attack; and responsively perform, by the BIOS, an action at the computing device to protect the computing device from the potential optical network intrusion attack, wherein the action includes transmission of a network packet to a specified destination, wherein the network packet indicates that the potential optical network intrusion attack occurred, and wherein the network packet includes a time at which the optical signal strength attenuated below the threshold.

17. The non-transitory computer-readable data storage medium of claim 16, wherein the action comprises at least one of:

disabling a network port at which the optical network transceiver is connected to the optical network;

notifying a user of the occurrence of the potential optical network intrusion attack;

logging the occurrence of the potential optical network intrusion attack within a system log;

disabling the computing device to prevent further usage of the computing device until the potential optical network intrusion attack has been resolved; or erasing all data stored on a storage device of the computing device.

18. A method, comprising:

generating, with an optical network transceiver of a computing device, the optical network transceiver connected to an optical network, an event that indicates that an optical signal strength has attenuated below a threshold;

transmitting, to a basic input/output system (BIOS) executed by a processor of the computing device, the processor coupled to the optical network transceiver, an interrupt from the optical network transceiver that a potential optical network intrusion attack has occurred;

determining, with the BIOS, generation of the event by the optical network transceiver responsive to receipt of the interrupt from the optical network transceiver indicating that the event has occurred at the computing device;

in response to determining that the event has been generated by the optical network transceiver, detecting, with the BIOS, occurrence of a potential optical network intrusion attack; and in response to detecting the occurrence of the potential optical network intrusion attack, performing, with the BIOS, an action at the computing device to protect the computing device from the potential optical network intrusion attack, wherein performance of the action includes transmitting a notification event to an operating system executed by the computing device, wherein the notification event indicates to a user the potential optical network intrusion attack has occurred.

19. The method of claim 18, wherein performing, with the BIOS, the action includes:

transmitting the notification event, wherein the notification event includes an audible alert corresponding to a visual queue of the potential optical network intrusion attack.

* * * * *